United States Patent
Frechen et al.

(10) Patent No.: US 8,197,690 B2
(45) Date of Patent: Jun. 12, 2012

(54) METHOD AND APPARATUS FOR BIOLOGICAL WASTEWATER PURIFICATION

(75) Inventors: Franz-Bernd Frechen, Kassel (DE); Wernfried Schier, Kassel (DE)

(73) Assignee: Universitaet Kassel, Kassel (DE)

( * ) Notice: Subject to any disclaimer, the term of this patent is extended or adjusted under 35 U.S.C. 154(b) by 490 days.

(21) Appl. No.: 12/375,029

(22) PCT Filed: Jul. 20, 2007

(86) PCT No.: PCT/EP2007/006462
§ 371 (c)(1),
(2), (4) Date: Sep. 21, 2009

(87) PCT Pub. No.: WO2008/012030
PCT Pub. Date: Jan. 31, 2008

(65) Prior Publication Data
US 2010/0012582 A1    Jan. 21, 2010

(30) Foreign Application Priority Data

Jul. 28, 2006   (DE) .................. 10 2006 034 984

(51) Int. Cl.
*C02F 3/00* (2006.01)
(52) U.S. Cl. ......... 210/620; 210/626; 210/150; 210/151
(58) Field of Classification Search .................. 210/620, 210/626, 150–151
See application file for complete search history.

(56) References Cited

U.S. PATENT DOCUMENTS

| | | | |
|---|---|---|---|
| 4,201,533 A | 5/1980 | Holzschuh | 425/451.9 |
| 4,407,717 A | 10/1983 | Teletzke et al. | 210/616 |
| 4,500,427 A * | 2/1985 | Suzuki et al. | 210/608 |
| 5,868,934 A * | 2/1999 | Yamasaki et al. | 210/605 |
| 5,902,484 A * | 5/1999 | Timpany | 210/621 |
| 6,824,685 B2 | 11/2004 | Katsu et al. | 210/626 |
| 2003/0192825 A1* | 10/2003 | Chang et al. | 210/483 |
| 2005/0023216 A1* | 2/2005 | Kraft et al. | 210/607 |
| 2005/0194310 A1* | 9/2005 | Yamamoto et al. | 210/605 |
| 2009/0095674 A1 | 4/2009 | Fujishima | |
| 2010/0012582 A1* | 1/2010 | Frechen et al. | 210/620 |

FOREIGN PATENT DOCUMENTS

| | | |
|---|---|---|
| DE | 1658052 | 12/1972 |
| DE | 27 47 807 | 4/1979 |
| DE | 3504037 A1 | 8/1986 |
| DE | 29620426 | 4/1997 |
| DE | 19727984 | 7/1999 |
| DE | 10221712 | 11/2003 |
| JP | 2005349327 A | 12/2005 |
| WO | WO 2004/002604 | 1/2004 |

OTHER PUBLICATIONS

K.-D.Kummer and W.F.Geiger Stabilization of Activated Sludge Processes During Wet Weather Flow Through Microscreening, Wat.Sci. Tech. vol. 29 No. 1-2.pp. 393-399, 1994, Pergamon, Great Britain.

* cited by examiner

*Primary Examiner* — Chester Barry
(74) *Attorney, Agent, or Firm* — Andrew Wilford

(57) ABSTRACT

A biological wastewater is mixed in an activated sludge tank with activated sludge that is concentrated in the activated sludge tank to a predetermined value. The mixture of wastewater and activated sludge running off in a drain of the activated sludge tank is then sieved to effect an incomplete solid/liquid separation that leaves a separated solid phase in the activated sludge tank. The liquid phase including a remnant of solids is then removed from the tank.

10 Claims, 2 Drawing Sheets

METHOD AND APPARATUS FOR BIOLOGICAL WASTEWATER PURIFICATION

CROSS REFERENCE TO RELATED APPLICATIONS

This application is the US national stage of PCT application PCT/EP2007/006462, filed 20 Jul. 2007, published 31 Jan. 2008 as WO2008/012030, and claiming the priority of German patent application 102006034984.9 itself filed 28 Jul. 2006, whose entire disclosures are herewith incorporated by reference.

FIELD OF THE INVENTION

The invention relates to a method of biological wastewater purification in which wastewater is mixed in an activated sludge tank with activated sludge and in which the activated sludge present in the activated sludge tank is concentrated to a predetermined value as well as to an apparatus having an inlet and an outlet and set up for carrying out the method of this invention.

BACKGROUND OF THE INVENTION

In the conventional activated sludge method, cleaning performance is achieved in an activated sludge tank by activated sludge (bacterial sludge). In order to concentrate active biomass in the activated sludge tank, the activated sludge that is gravimetrically thickened in a secondary clarifier tank is pumped back in the activated sludge tank with a return ratio of up to 150% relative to the average amount of dry water. This results in a dry substance content $TS_{BB}$ of about 3 to 4 g/l in the activated sludge tank. This limits the performance of the wastewater purification plant and increases the hydraulic load on the activated sludge tank and secondary clarifier tank. Furthermore, a large amount of energy is required for the pumps.

In the cascade method higher $TS_{BB}$'s can be achieved but the average dry substance content is only insignificantly higher.

The use of lamellar separators, e.g. in the outlet of the activated sludge tank, has not proven itself because in this case, as in settling tanks, only gravity is at work and because the removal of the thickened sludge is problematic.

Another known possibility for concentrating activated sludge is offered by the membrane-activated sludge method. In it at least one filter membrane is provided in an activated sludge tank or in a separate filtration tank. In order to avoid clogging, the pores of this filter membrane should not exceed a maximal size of 0.4 µm, better 0.1 µm. It is furthermore necessary that a is sufficient flow be maintained on the filter membrane in order that the formation of a cover layer on the membrane is minimized. The water flowing off is free of undissolved substances due the pore size. Therefore, on the one hand good concentration of the activated sludge is possible. On the other hand, the dry substance content on the filter membrane should not exceed circa 12 g/l. Therefore, on the whole the solid content in the activated sludge tank is limited at the top. A high flow rate and in the case of a separate filtration tank a high recirculation rate must be maintained; this has the result that even unpurified wastewater passes to the filter membrane due to bypasses, which can lead to premature fouling. Furthermore, excess sludge must be separately removed.

WO 2004/002604 teaches a rake in which rotating sieve elements are provided in steps. Nozzles for cleaning the sieve elements are provided on an upper deflection roller. The rake is not suitable for concentrating activated sludge in an activated sludge tank. The use in an activated sludge tank is not mentioned.

DE 197 27 984 describes an apparatus for removing floating sludge from a wastewater purification tank in which a circulating dewatering belt extends to the surface of the water in the purification tank such that it slightly dips into the water. The material floating on the water surface is removed by the apparatus. This apparatus is not suitable for increasing the biological purification performance in an activated sludge tank.

OBJECTS OF THE INVENTION

The object of the invention is to provide a method of biological wastewater purification that is highly effective with relatively low energy usage. A further object is to provide an apparatus for carrying out the method.

SUMMARY OF THE INVENTION

The first object is attained in that the mixture of wastewater and activated sludge running off in a drain of the activated sludge tank is subjected to an incomplete solid/liquid separation, and a separated solid phase remains in the activated sludge tank whereas a liquid phase including a remnant of solids is removed. As a result of the fact that the mixture of wastewater and activated sludge in an outlet of the activated sludge tank is subjected to incomplete solid/liquid separation, and that a separated solid phase remains in the activated sludge tank whereas a liquid phase is removed, a very high dry substance content can be established in the activated sludge tank. As a result, very high degradation performance is achieved so that an optimal degree of efficiency is achieved with an activated sludge tank of relatively low volume. At the same time the load is removed from a secondary clarification or a membrane filtration because no or only very little return sludge has to be returned to the circuit and/or because significantly less solid reaches the membranes. It is also possible, in accordance with local requirements, to adjust the solid/liquid separation in such a manner that only an increase of the dry substance is achieved in the activated sludge tank at the same loading of the secondary clarification or only a removal of the load on the secondary clarification with the same dry substance content in the activated sludge. Any intermediate levels can be set.

The invention can be used with special advantage in the case of problem sludge. This includes sludge with voluminous sludge structures such as bulking sludge or sludge with solid components that tend to cause clogging or have a high fiber content, because the problem substances can be separated off and removed, whereas they are concentrated in the known methods. Also, the method can be reliably operated because an incomplete solid/liquid separation does not tend to cause clogging on account of the separated amount, which is large in comparison to a membrane. The method can be readily retrofitted for existing wastewater-purification methods, so that an expensive expansion of waste treatment plants is avoided.

A filtration that is conducted so that part of the solids is removed with the liquid phase can be carried out readily and with a reliable operation with a significant part of the activated sludge being retained.

If an amount of the solids removed with the liquid phase corresponds to an average amount of excess sludge, no return sludge has to be pumped but rather only excess sludge has to be removed.

The invention can be used with special advantage in the activated sludge method or in the membrane-activated sludge method.

High performance density is achieved with a dry substance content in the activated sludge tank of 3 to 8 g/l for conventional activated sludge methods or 8 to 20 g/l, preferably 10 to 15 g/l for membrane-activated sludge methods without problems occurring in the aeration.

The solids remaining in the liquid phase are readily and effectively separated in the secondary clarification tank.

BRIEF DESCRIPTION OF THE DRAWING

The invention is explained further using the illustrated embodiment schematically shown in the drawings.

DETAILED DESCRIPTION

Figure 1:
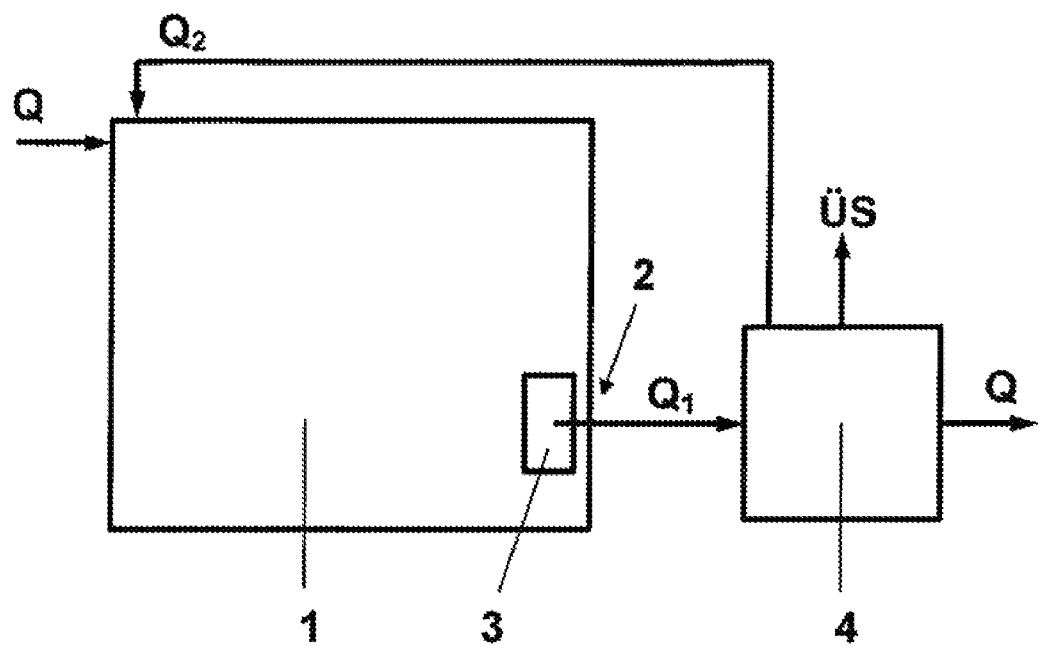
FIG. 1 is a schematic illustration of the method in accordance with the invention using the example of a conventional activated sludge method.

As is apparent from FIG. 1 a wastewater stream Q is continuously introduced into an activated sludge tank 1 where it is intensively mixed with a wastewater/activated-sludge mixture for a predetermined average residence time. At the same time, the mixture is aerated, as a result of which dissolved substances are biologically degraded. The means for the thorough mixing and aeration are not shown. The activated sludge tank 1 is followed by a secondary clarification tank 4. From here, a return sludge stream $Q_2$ is recycled, if necessary, to the activated sludge tank 1.

Figure 2:
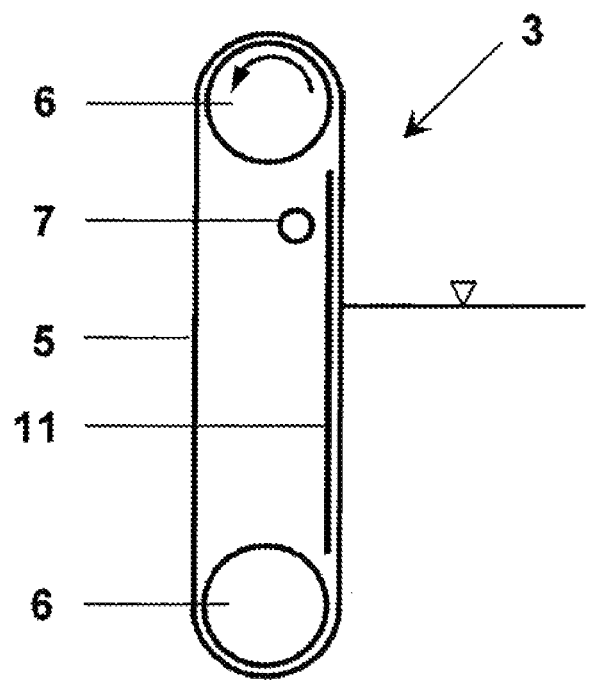
FIG. 2 shows an endless sieve belt as an example for an apparatus for solid/liquid separation.

An apparatus 3 for the incomplete solid/liquid separation is provided in a drain 2 of the activated sludge tank 1 in such a manner that the entire draining mixture amount $Q_1$ (=$Q+Q_2$) is treated here. The apparatus 3 comprises in this example according to FIG. 2 an endless sieve belt 5 guided over two horizontal rollers 6 mounted vertically above the other. One of the rollers 6 can be driven in such a manner that one reach of the sieve belt 5 rises from the activated sludge tank 1. A cleaning apparatus 7 is provided for this reach above the water level in the activated sludge tank 1, e.g. a water line with appropriate cleaning nozzles. The sieve belt 5 is for example a fabric of metal or plastic with a mesh width of 0.1 to 1.0 mm and is supported on the rising reach by for example a perforated sheet 11 against the standing water pressure.

During operation, the wastewater stream Q is fed into the activated sludge tank 1 and aerated there as well as mixed with activated sludge. At this time the wastewater is purified biologically by microorganisms, expressed as dry substance content $TS_{BB}$. The purified wastewater/activated sludge mixture $Q_1$ flows to the drain 2, where the greatest part of the activated sludge is separated off by the sieve belt 5 and is thus retained in the activated sludge tank 1. The liquid phase with a remnant of solids flows off through the sieve belt 5 into the secondary clarification tank 4. As a result of the complete thorough mixing in the activated sludge tank 1 the separated activated sludge is rapidly and effectively distributed here. In this manner, on the one hand a high dry substance content $TS_{BB}$ of 4 to 8 g/l is established in the activated sludge tank 1, which has as a consequence the is correspondingly high purification performance per unit of volume of the activated sludge tank 1. For this, no or only little return sludge $Q_2$ must be run in the circuit, as a function of the separating performance and the selected $TS_{BB}$, as a result of which the hydraulic load is correspondingly removed from the activated sludge and the secondary clarification. On the other hand, less solids are conducted to secondary clarification 4, which results in particular in combination with the hydraulic reduction of load in better settling qualities of the sludge and thus a discharge of the clarification plant that is on the whole less loaded is achieved.

The sieve belt 5 is continuously driven. At this time the solids of mixture $Q_1$ flowing out of the activated sludge tank settle to a preponderant degree on the surface of the sieve belt 5 and are separated from it by the turbulence present in the activated sludge tank 1 and by the cleaning apparatus 7. The cleaning apparatus 7 is also continuously operated and sprays liquid, e.g. purified wastewater, against the inside face of the rising reach.

A discontinuous or quasicontinuous mode of operation of sieve belt 5 and of cleaning apparatus 7 can be alternatively used.

In the secondary clarification tank 4 the solids remaining in the liquid phase are separated by gravity to a very great extent and removed as excess sludge ÜS. If necessary, part of the solid is pumped back as return sludge $Q_2$ into the activated sludge tank, which amount of return sludge $Q_2$ is significantly less than in the conventional activated sludge method without sludge retention in accordance with the invention. In the ideal case, this can be done by selecting an appropriate mesh width of the sieve belt 5, the solids remaining in the liquid phase corresponding to the amount of excess sludge ÜS, so that no return sludge $Q_2$ has to be pumped and all the solids supplied to the secondary clarification tank 4 are drawn off thickened as excess sludge ÜS.

A flocculent and/or precipitation agent is optionally charged into the inlet to the secondary clarification tank 4 in order to improve the settling behavior and/or to separate dissolved problem substances such as for example phosphorus.

Figure 3:
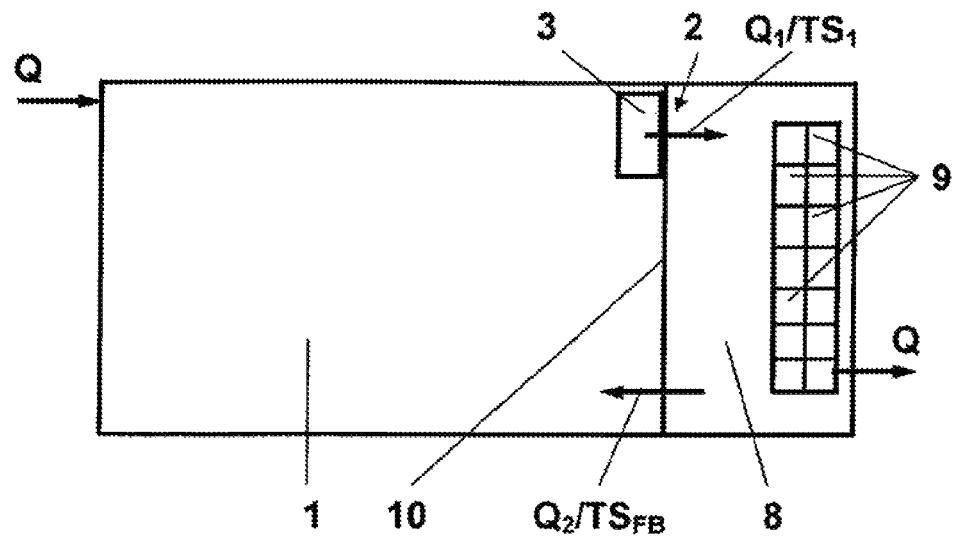
FIG. 3 is a schematic illustration of the method using the example of a membrane-activated sludge method.

In another illustrated embodiment according to FIG. 3 the invention is used in a membrane-activated sludge method. The wastewater is conducted into the activated sludge tank 1, that is directly followed by a filtration tank 8. Ideally, the activated sludge tank 1 and the filtration tank 8 are combined in one tank in which they are separated for example by a partition 10. A plurality of membrane modules 9 is provided in the filtration tank 8, whose membranes are permeable to liquid and impermeable to undissolved substances. The pore size of the membranes is, e.g. 0.1 to 0.4 μm.

The drain 2 from activated sludge tank 1 into the filtration tank 8 is in one end of the partition 10 on the tank side. The apparatus 3 for the incomplete solid/liquid separation is provided on the drain 2 in such a manner that the entire mixture amount $Q_1$ running off is treated here. Furthermore, an opening for a return of stream $Q_2$ is provided in the partition 10 at the end opposite the drain 2.

Figure 4:
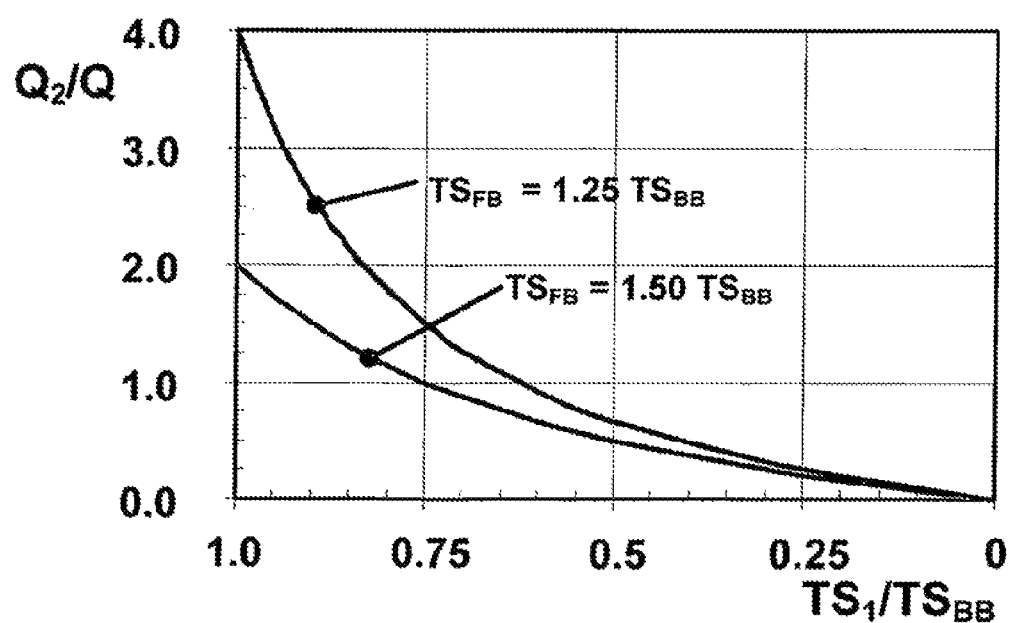
FIG. 4 is a diagram showing the dependency of the return amount necessary here.

The operation of the membrane-activated sludge method takes place as described above for the activated sludge method with the following differences:

The liquid phase with a residue of solids flows out through the sieve belt 5 into the filtration tank 8. Here the remaining solids are completely separated in such a manner that they accumulate. The liquid phase is conducted off as purified wastewater and subsequently treated if necessary. In order that a too high concentration of solids in the filtration tank 8 with the known disadvantages is avoided, dilution must take place here. This is achieved by the return stream $Q_2$ into the activated sludge tank 1, so that on the one hand an elevation of the dry substance content $TS_{BB}$ takes place in the activated sludge tank 1 and on the other hand dilution takes place in the filtration tank 8 to the desired dry substance content $TS_{FB}$. Therefore, a wastewater/activated sludge mixture is recycled. As becomes clear from FIG. 4, the required return amount of flow $Q_2$ is heavily dependent, under conditions that are otherwise the same, on the dry substance content $TS_1$ of the mixture flowing to the filtration tank 8 and therewith on the degree of separation of the apparatus 3 for the incomplete solid/liquid separation. The higher the degree of separation is here, the lower the required return amount of $Q_2$. Thus, e.g. for a customary $TS_{FB}/TS_{BB}$ ratio of 1.25 and a degree of separation of the sieve belt of 50%, the required return amount of stream $Q_2$ is reduced to distinctly less than one fourth of the return amount of $Q_2$ required without separation. On the one hand, this saves pump energy and on the other hand the creation of bypass currents is at least reduced, so that the danger of the bypassing of unpurified wastewater components and therewith also a premature fouling of the membranes is avoided.

The invention claimed is:

1. A method of biological wastewater purification comprising the steps of:
   mixing wastewater in an activated sludge tank with activated sludge,
   concentrating the activated sludge in the activated sludge tank to a predetermined value,
   sieving the mixture of wastewater and activated sludge running off through a sieve belt at a drain of the activated sludge tank to effect an incomplete solid/liquid separation,
   leaving a separated solid phase in the activated sludge tank, and
   removing a liquid phase including a remnant of solids.

2. The method according to claim 1 wherein the solid/liquid separation takes place by filtration conducted in such a manner that a part of the undissolved substances is removed with the liquid phase.

3. The method according to claim 1, further comprising the step of:
   establishing a dry substance content of 4 to 8 g/l in the activated sludge tank.

4. The method according to claim 1, further comprising the step of
   conducting the liquid phase into a secondary clarification tank.

5. The method according to claim 1 wherein it is a membrane-activated sludge method.

6. The method according to claim 5 wherein a dry substance content of 8 to 20 g/l is established in the activated sludge tank.

7. An apparatus for biological wastewater purification, the apparatus comprising:
   an activated sludge tank comprising an inlet and an outlet, and
   an endless sieve belt for incomplete solid/liquid separation at the outlet.

8. The apparatus according to claim 7 wherein the apparatus for the solid/liquid separation comprises a fabric.

9. The apparatus according to claim 7, further comprising a secondary clarification tank downstream of the activated sludge tank.

10. The apparatus according to claim 7 wherein the activated sludge tank is a membrane-activated sludge reactor.

* * * * *